(12) United States Patent  (10) Patent No.: US 11,994,244 B2
Mann  (45) Date of Patent: May 28, 2024

(54) HIGHLY ELASTIC METAL SEAL

(71) Applicant: SPM Oil & Gas PC LLC, Fort Worth, TX (US)

(72) Inventor: Michael L. Mann, Houston, TX (US)

(73) Assignee: SPM Oil & Gas PC LLC, Fort Worth, TX (US)

( * ) Notice: Subject to any disclaimer, the term of this patent is extended or adjusted under 35 U.S.C. 154(b) by 9 days.

(21) Appl. No.: 17/625,728

(22) PCT Filed: Jul. 7, 2020

(86) PCT No.: PCT/US2020/041085
§ 371 (c)(1),
(2) Date: Jan. 7, 2022

(87) PCT Pub. No.: WO2021/007261
PCT Pub. Date: Jan. 14, 2021

(65) Prior Publication Data
US 2022/0282812 A1   Sep. 8, 2022

Related U.S. Application Data

(60) Provisional application No. 62/871,672, filed on Jul. 8, 2019.

(51) Int. Cl.
*F16J 15/08* (2006.01)
*F16L 23/20* (2006.01)
*E21B 33/03* (2006.01)

(52) U.S. Cl.
CPC .......... *F16L 23/20* (2013.01); *F16J 15/0887* (2013.01); *E21B 33/03* (2013.01)

(58) Field of Classification Search
CPC .......... F16J 15/02; F16J 15/021; F16J 15/022; F16J 15/025; F16J 15/06; F16J 15/08; F16J 15/0806; F16J 15/0887; E21B 33/03; F16L 23/20
See application file for complete search history.

(56) References Cited

U.S. PATENT DOCUMENTS

| 4,836,694 | A |   | 6/1989 | Schmehr |  |
|---|---|---|---|---|---|
| 4,900,041 | A | * | 2/1990 | Hopkins | E21B 33/04 166/115 |
| 5,224,715 | A | * | 7/1993 | Downes | E21B 33/04 277/626 |
| 7,425,003 | B2 | * | 9/2008 | Anderson | F16J 15/3244 277/648 |
| 8,205,890 | B2 | * | 6/2012 | Sundararajan | F16J 15/28 277/647 |

(Continued)

*Primary Examiner* — Gilbert Y Lee

(57) ABSTRACT

A highly elastic annular seal assembly includes a metal stabilator having inner and outer spaced-apart and projecting annular plates coupled to a common base and forming a U-shaped geometry, and a metal seal ring having inner and outer spaced-apart and projecting annular plates coupled to a common base and having a U-shaped geometry with a central groove. The stabilator plates are configured to be disposed within the central groove between the seal ring plates, and the stabilator plates being configured to gradually urge the seal ring plates outward as the seal ring and stabilator are brought together until a portion of the first seal ring plate contacts and forms a seal against a mating body disposed within the first seal ring plate.

17 Claims, 7 Drawing Sheets

(56) References Cited

U.S. PATENT DOCUMENTS

| | | | |
|---|---|---|---|
| 8,561,995 B2* | 10/2013 | Thomson | E21B 33/038 |
| | | | 277/339 |
| 8,668,021 B2 | 3/2014 | Duong | |
| 10,900,316 B2* | 1/2021 | Ford | E21B 33/0422 |
| 2011/0049815 A1 | 3/2011 | Wagner | |
| 2013/0264778 A1 | 10/2013 | Doyle | |
| 2016/0040498 A1 | 2/2016 | Ford | |

* cited by examiner

HIGHLY ELASTIC METAL SEAL

CROSS-REFERENCE TO RELATED APPLICATION

This application is a national phase application of Patent Cooperation Treaty Application No. PCT/US2020/041085 filed Jul. 7, 2020, which claims priority to U.S. Provisional Application No. 62/871,672 filed Jul. 8, 2019, which is incorporated herein by reference in their entirety.

FIELD

The present disclosure relates generally to seals, and in particular to a to a highly flexible metal seal that has the ability to regulate forces and contact stresses required for sealing over the full range of the flexing seal profile. The seal is generally used for high-pressure applications such as in oil and gas completions and production equipment.

BACKGROUND

Wellhead equipment to produce natural gas and petroleum are often subjected to high pressure and high temperature environments. For example, equipment such as those used for hydraulic fracturing may include one or more positive displacement pumps, slurry blender, fracturing fluid tanks, and high-pressure flow iron (pipe or conduit) that are designed to move the highly abrasive and corrosive fracking slurry and other fluids at high temperature (e.g., 1,000 degrees F.) and high pressure (e.g., up to 30,000 psi).

DETAILED DESCRIPTION

Metal-to-metal seals are typically used to isolate cavities within oilfield completion and production systems that include production tubing, casing, wellheads and isolation/control valving, among other equipment. Complete metal-to-metal bodies are often used because they are well suited for sealing high pressures and high temperatures beyond 30,000 psi and 1,000 degrees Fahrenheit. Interference between a soft metal seal and a mating surface is used to create a seal energizing force between the seal and a mating body (e.g., pipe or casing), resulting in a pressure boundary that can contain fluids and gases within the well without any leaks. However, because metal generally has a higher stiffness and a more crystalline microstructure compared to elastomeric materials, the sealing geometry and mating sealing surfaces must be tightly controlled. Typically, acceptable seal tolerance ranges are within 0.02 inches while the sealing piping elements may have large outer diameter variations of 1.0 inch or more. Consequently, conventional metal-to-metal seals require highly controlled manufacturing processes to produce seals with a tight tolerance that closely match the production equipment sealing surfaces. When metal seals are used to seal against a metallic surface such as a pipe with a high degree of dimensional variation, multiple seals are typically provided as part of a seal assembly so that a field operator can best closely match the seal to accommodate the pipe. However, these conventional multi-seal solutions increase part count, cost, and complexity. Further, bolts, clamps or other lock down devices are also used to provide a set amount of force to sufficiently secure the equipment in addition to providing the energizing force that creates the metal-to-metal seal. The use of such fasteners to forcibly apply ill-matched seals over a wide range of seal deflection to the pipes may lead to stresses that could cause catastrophic failure.

It is thus desirable to design a metal-on-metal seal that is highly flexible with the ability to regulate forces translated to it over the full range of the seal stroke. This new seal system can be deployed in pressure connections with varying pipe diameters so that a single seal could be used to accommodate a wide variation of sealing diameters, thereby no longer requiring multi-seal assemblies.

Figure 1:
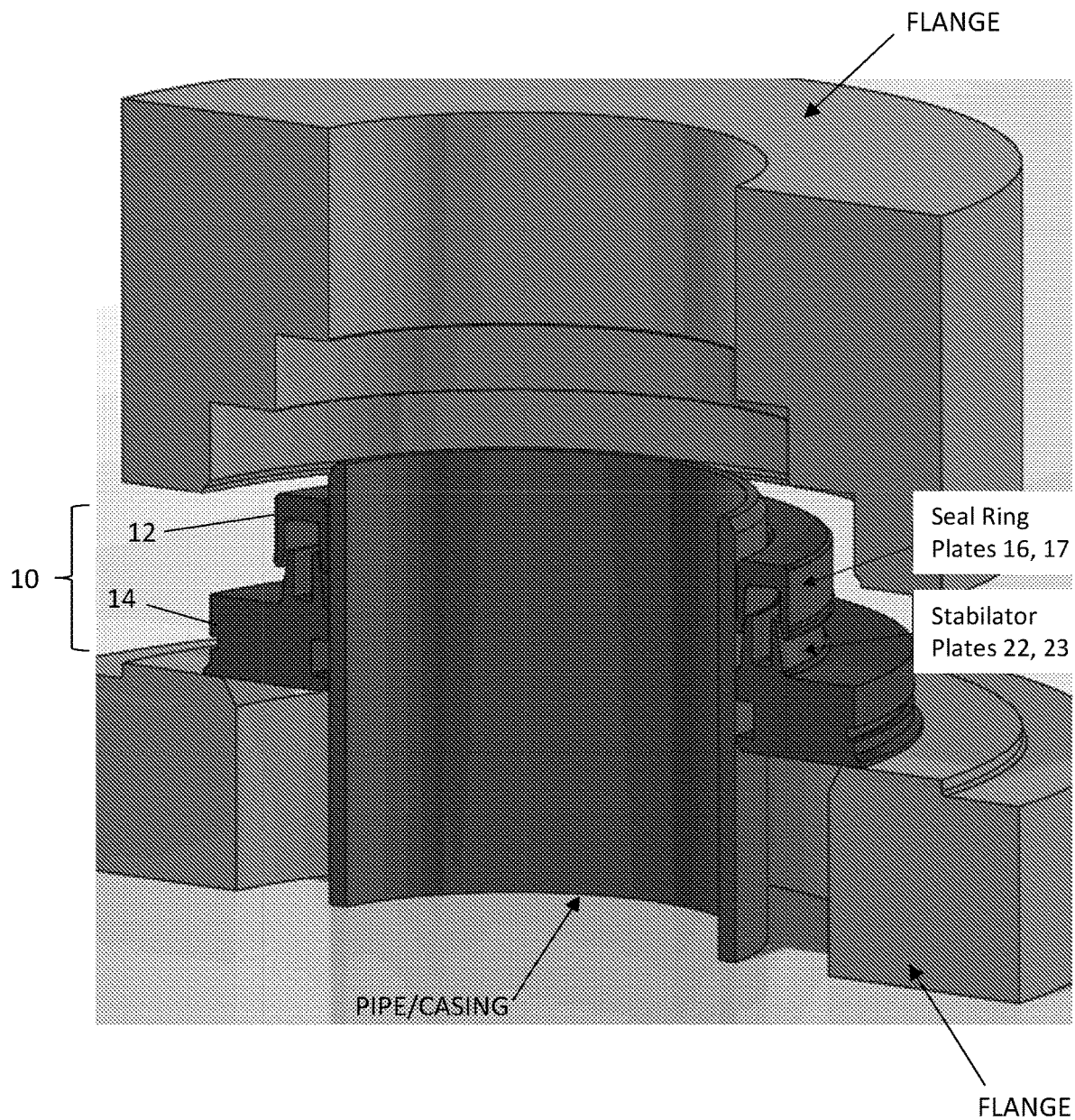
FIG. 1 is a cross-sectional perspective view of an exemplary embodiment of a highly elastic metal seal ring and stabilator according to the teachings of the present disclosure.
Figure 2:
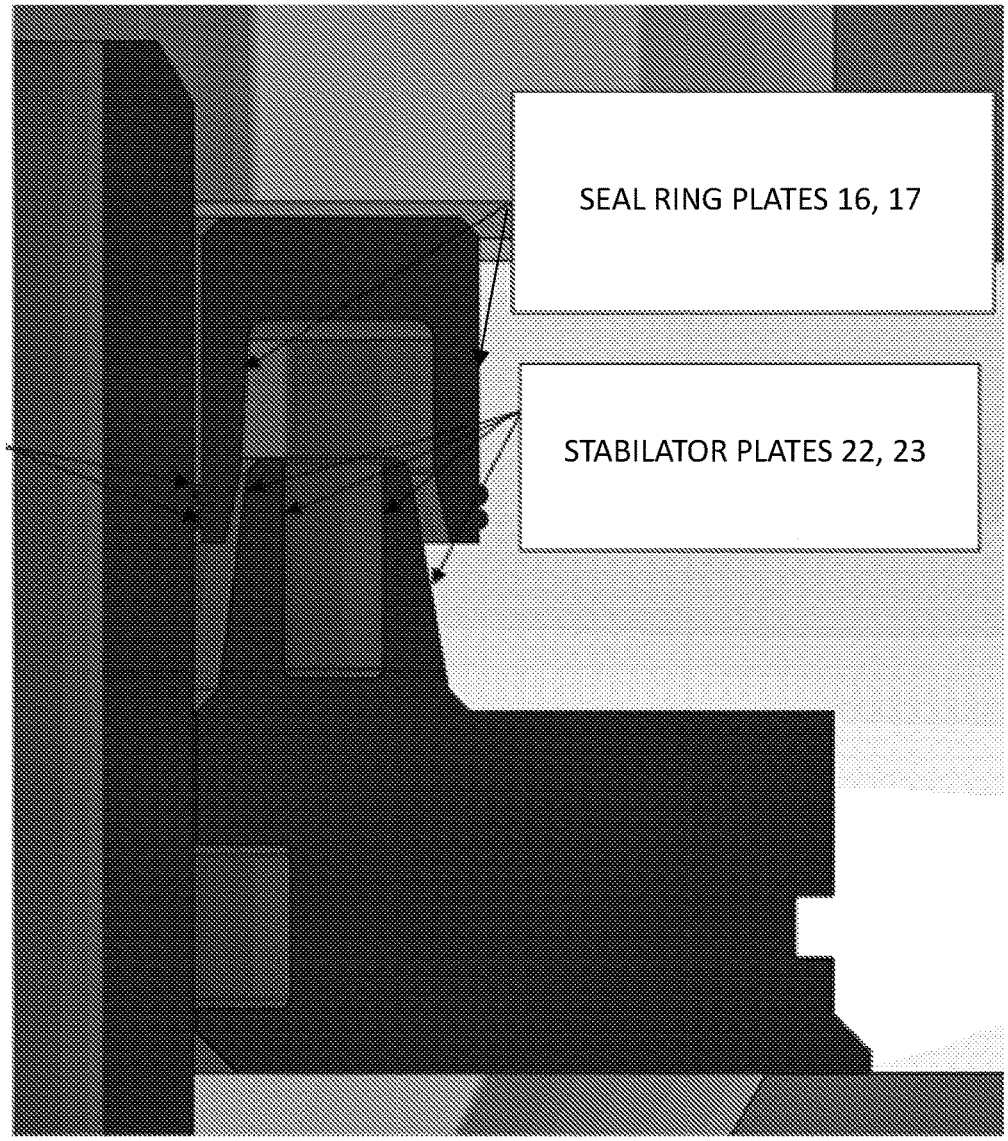
FIG. 2 is a closer cross-sectional perspective view of an exemplary embodiment of a highly elastic metal seal ring and stabilator according to the teachings of the present disclosure.
Figure 3:
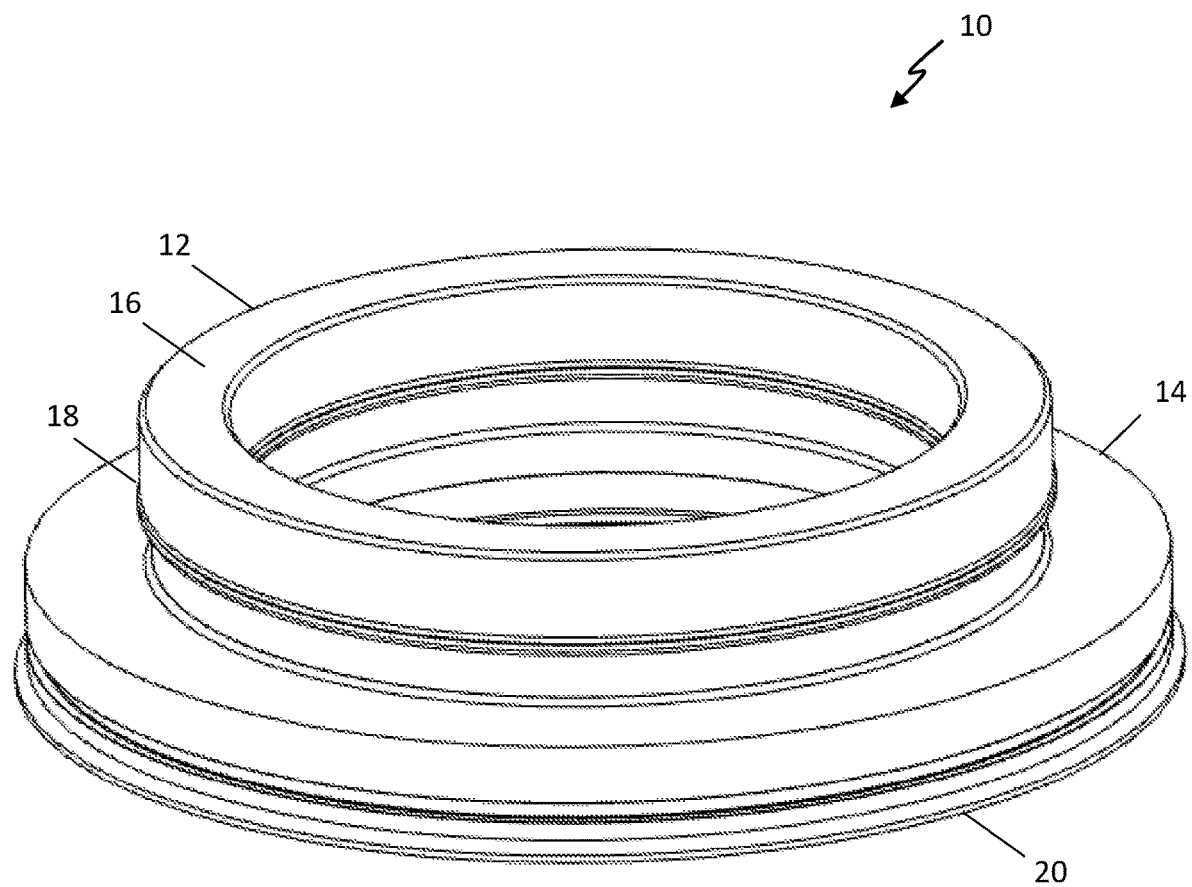
FIGS. 3-5 are perspective views of an exemplary embodiment of a highly elastic metal seal ring and stabilator according to the teachings of the present disclosure.
Figure 4:
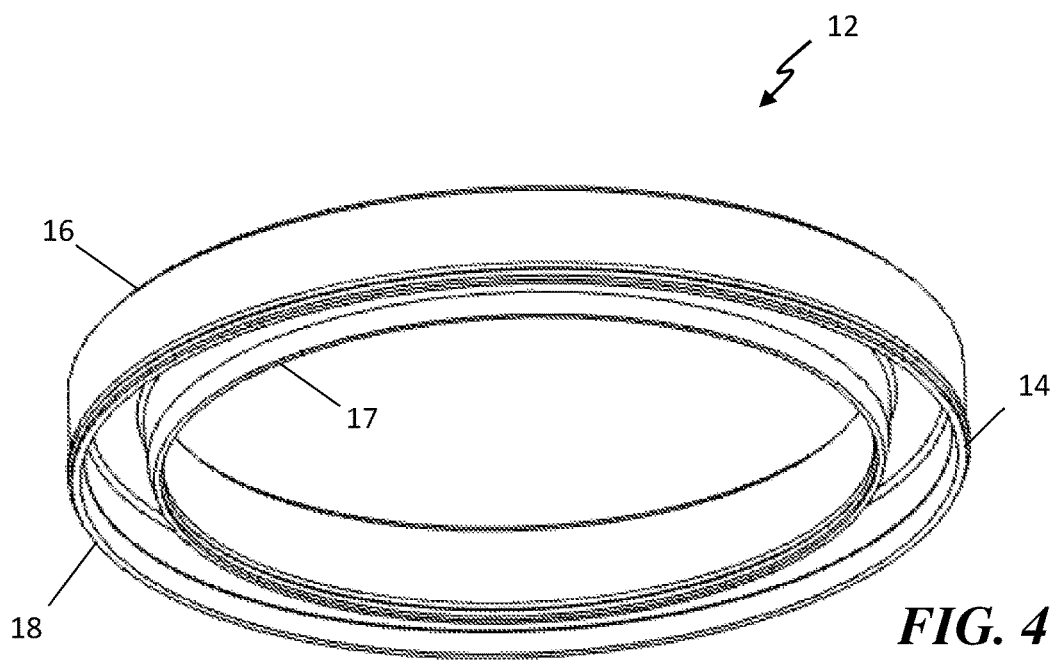
Figure 5:
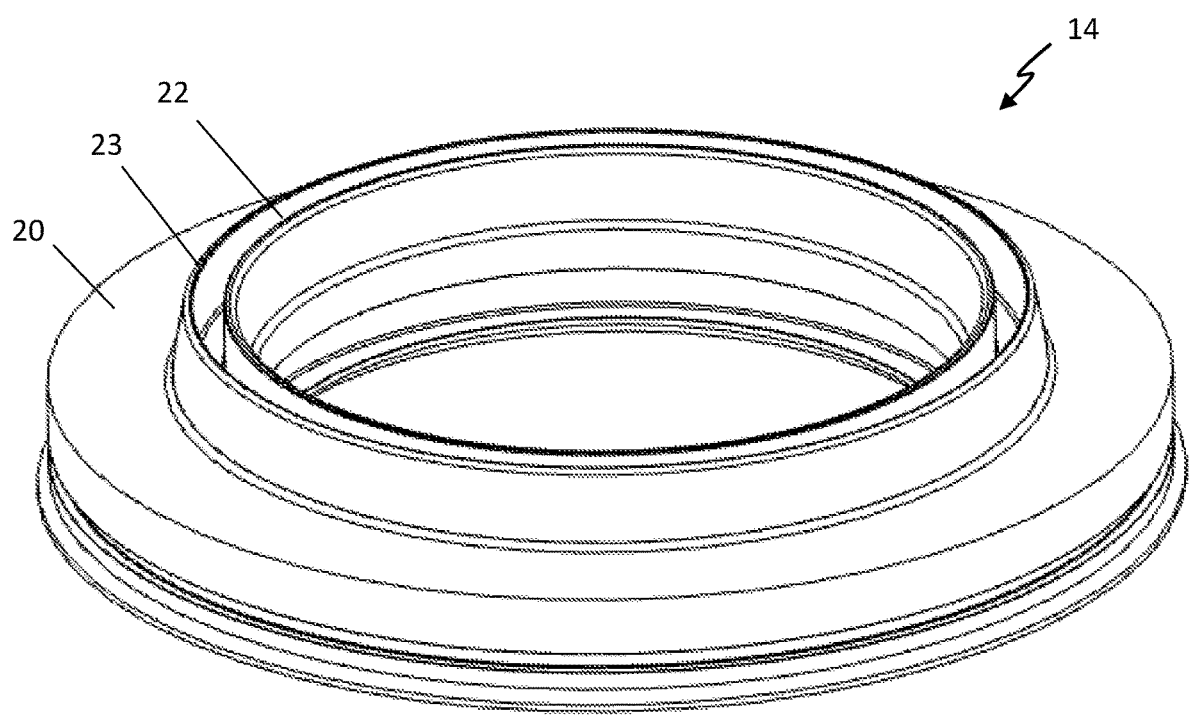
Figure 6:
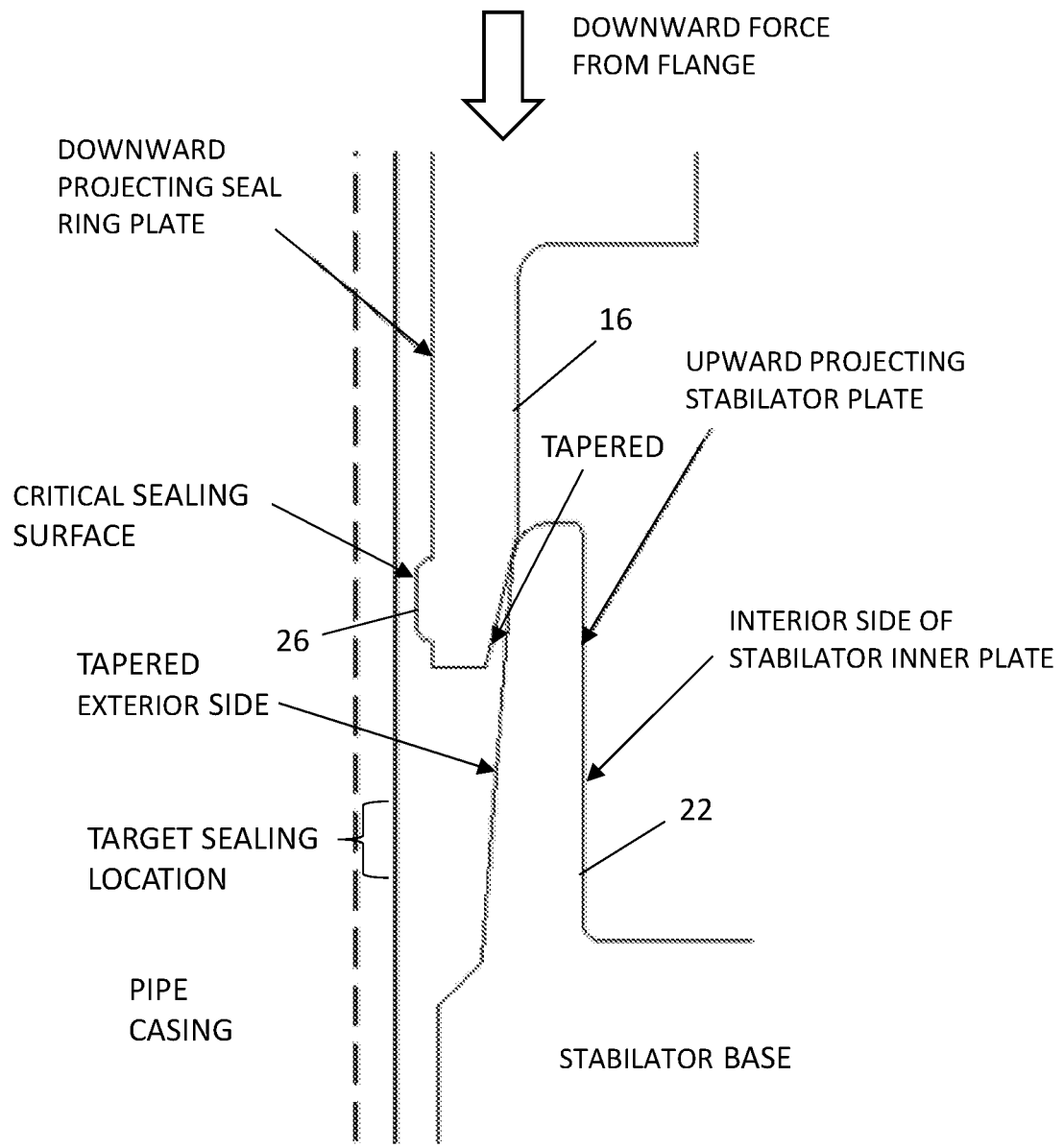
FIG. 6 is a cross-sectional view of an exemplary embodiment of a highly elastic metal seal ring and stabilator according to the teachings of the present disclosure.

FIGS. 1-9 are various views of an exemplary embodiment of a highly elastic metal seal system 10 according to the teachings of the present disclosure. FIG. 1 is a cross-sectional view that show a metal seal assembly 10 disposed between two flanges about a pipe casing. The seal assembly 10 has two components, a seal ring 12 and a stabilator 14. The seal ring 12 and stabilator 14 may be constructed of any suitable metal, including stainless steel and carbon steel. The seal ring 12 includes a base 16 with an inner plate 17 and an outer plate 18. Similarly, the stabilator 14 also includes a base 20 with an inner plate 22 and an outer plate 23. In the figures, the plates 17 and 18 of the seal ring 12 are made to fit on the outside of the inner and outer plates 22 and 23 of the stabilator 14 and thereby push the seal plates 16 and 17 outwardly. However, alternatively the stabilator plates 22 and 23 may be made to fit on the exterior of the seal ring plates 16 and 17 and thereby push the seal ring plates inwardly.

The seal ring 12 has a groove or U-shaped cross-section with cantilevered protrusions that contain critical surfaces for sealing capability. The stabilator 14 has a portion with an opposing U-shaped cross-section or plates 22 and 23 that receive the seal ring plats 16 and 17. Looking at the cross-section, the U-shaped seal ring 12 has two downwardly projecting cantilevered protrusions or plates 16 and 17 that may be in parallel or they may flare slightly inwardly or outwardly with tapered sides. The distal ends of the inner and outer plates 16 and 17 may have a tapered surface to facilitate the end of the stabilator plates 22 and 23 to be guided into the groove between the seal ring plates as the seal ring and the stabilator are brought together. The seal ring plates 16 and 17 are separated by a groove therebetween. The seal ring plates 16 and 17 may have varying thickness along their lengths. The seal ring plates 16 and 17 are circular in shape, which are designed and dimensioned to go about a pipe casing. Better seen in FIGS. 2 and 6, the distal end on the exterior surfaces of the seal ring plates 16 and 17 include one or more bumps or lips 26 that define a critical sealing surface that will ultimately contact and form a seal against the exterior surface of the pipe, casing or outlet connection. Alternatively, one or both of the seal ring plates 16 and 17 may include a thicker or enlarged distal end that forms the critical sealing surface.

The stabilator plate 14 has two cantilevered protrusions or plates 22 and 23 with slightly tapered exterior sides projecting from the base 20 of the stabilator 14. The stabilator plates 22 and 23 are also separated by an interior groove therebetween. The stabilator plate plates 22 and 23 may have varying thickness along their lengths and have tapered sides. When properly installed, the stabilator plates 22 and 23 are disposed within the circular groove between the seal ring plates 16 and 17. The base of the stabilator 20 may have any suitable shape or profile. It may be thought of that the general shape of the stabilator 14 has a special profiled section that includes cantilevered contours that can be used to deflect the mating seal ring plates and bend in an opposing direction to higher loads to alleviate stresses on the seal body. Relief cuts and geometry changes may also be placed on the profiled cantilever to stop the seal body from moving independently at a desired location and instead to move as a single system with combined stiffness and sectional properties.

The sealing surface(s) 26 on the seal ring plate 16 is forced against the mating seal surface such as pipe/casing outer diameter to cause an energization force that creates a pressure boundary along the seal ring 12. Stresses on the seal cross-section and seal lip(s) 26 are controlled and regulated by the interaction between the seal ring plates 16 and 17 and the stabilator plates 22 and 23 which are designed to flex at critical and targeted forces to (1) protect the seal assembly 10 from catastrophically failing and (2) to ensure there is enough seal energizing force to create a high-pressure sealing boundary.

Figure 7:
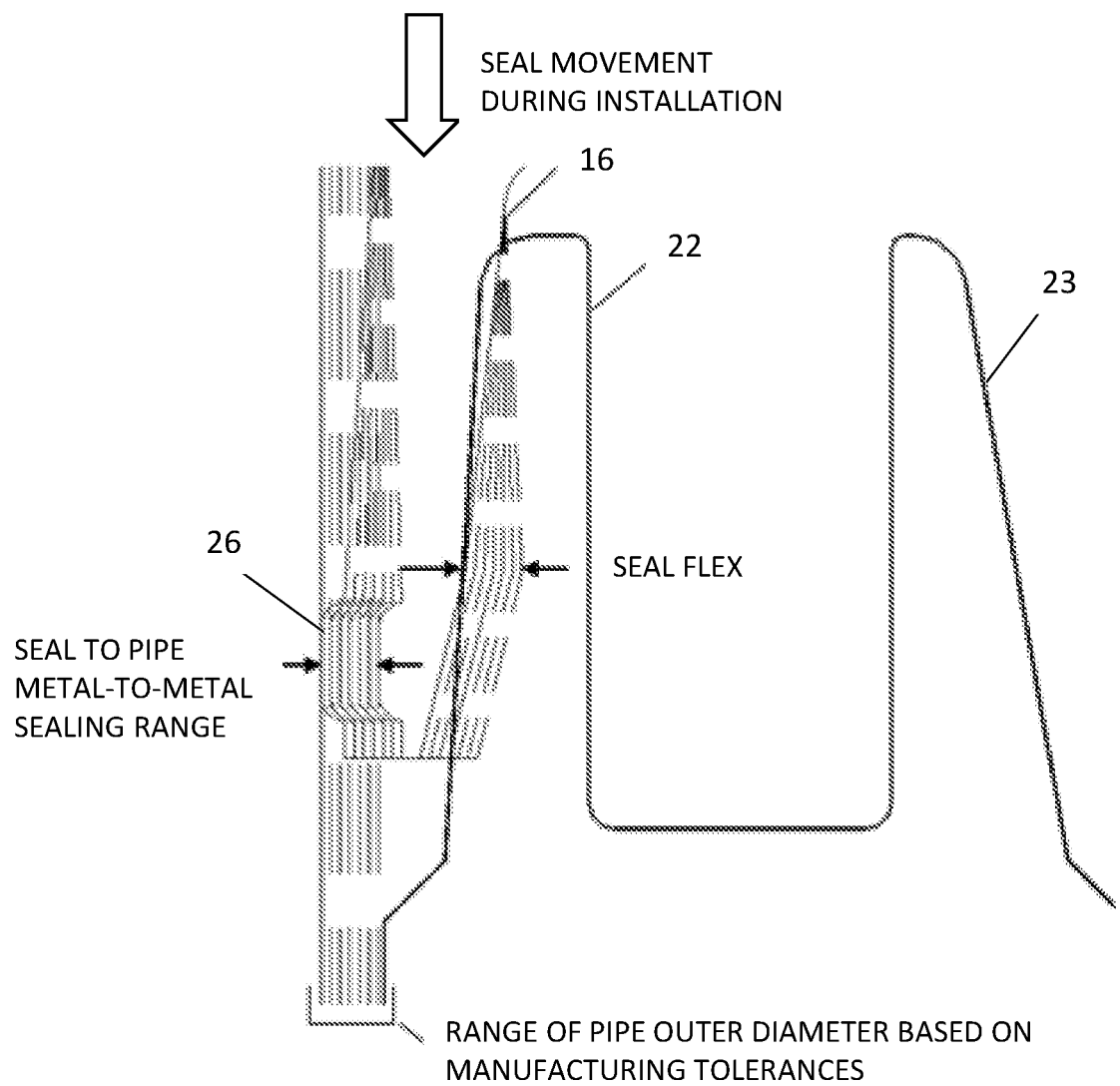
FIGS. 7 and 8 are partial cross-sectional views of an exemplary embodiment of a highly elastic metal seal ring showing its full range of flex and motion during installation to be able to accommodate and properly seal around metal profiles such as pipes with dimensional variations according to the teachings of the present disclosure.
Figure 8:
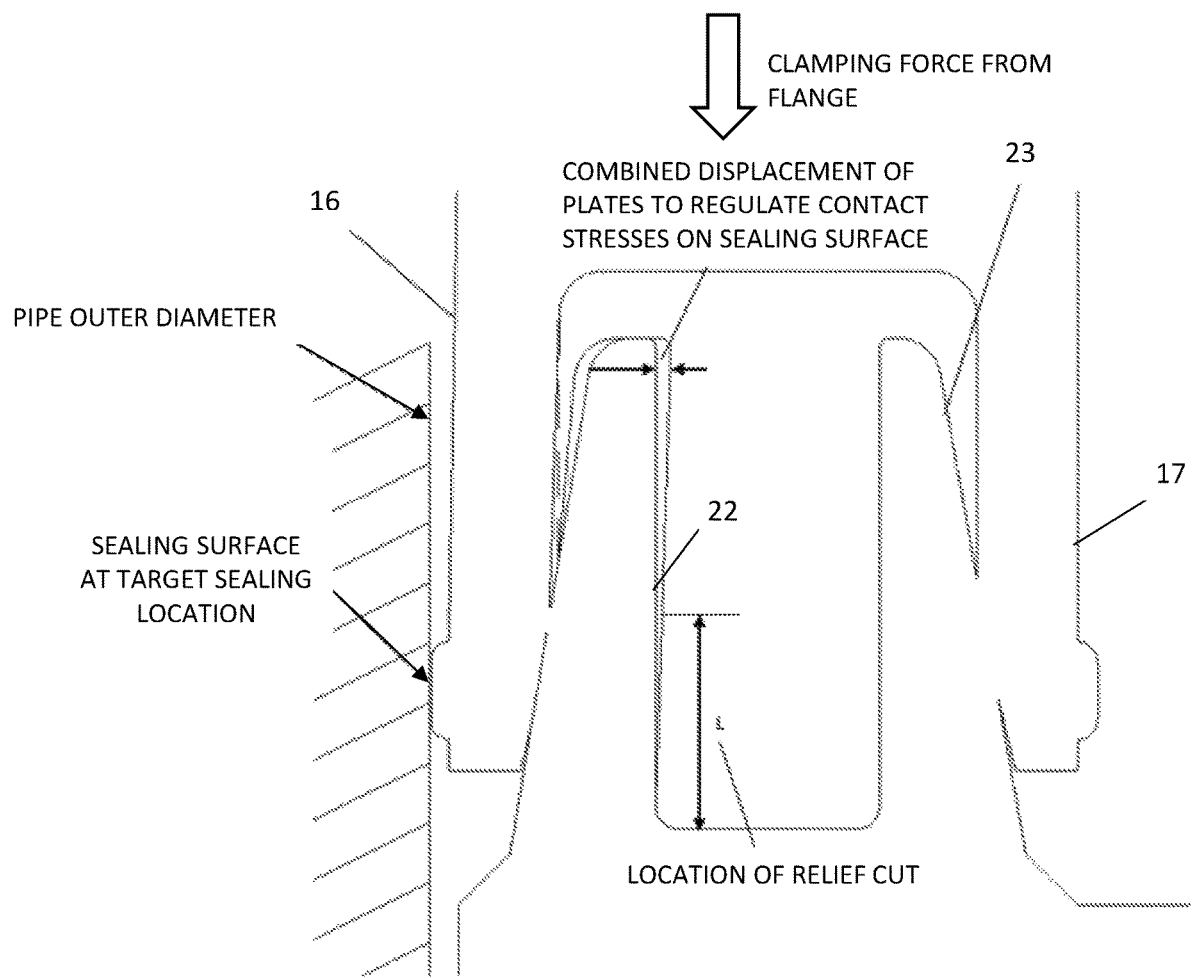

During installation, as shown in FIGS. 7 and 8, the seal ring's cantilevered contours or plates 16 and 17 slide down the cantilevered, tapered exterior sides of the stabilator plates 22 and 23, where both seal ring plates 16 and 17 become disposed on the exterior surfaces of the stabilator plates 22 and 23. The interior surface of the seal ring plates 16 and 17 thus come into contact with and slide down the exterior surface of the stabilator plates 22 and 23, and the inner seal ring plate 16 eventually comes into contact with and seal against the mating sealing surface of a pipe or casing (the surface of the mating body). As the seal ring is lowered, the tapered profile of the stabilator plate's exterior surfaces gradually urges the seal ring plates 16 and 17 outward until its critical sealing surface comes into contact with the pipe/casing or outlet connection, and creates a seal at or near a target sealing location (shown in FIG. 6) of the pipe/casing. Until the critical sealing surface(s) 26 on the seal ring plate 16 reaches the target location on the mating body (pipe/casing), the critical sealing surface is kept spaced apart or only lightly touching the mating sealing surface of the pipe/casing so that damage to the seal surface is averted. The precise site of the target sealing location will depend on the mating diametrical sealing surface variance of the pipe/casing or outlet connection. However, the geometry of the seal ring 12 and stabilator 14 allows a wider range of variations in the outer diameter of the pipe/casing or outlet connection. The stabilator plates will also prevent premature buildup of contact stresses and forces by providing a cushion on the backside of the seal once enough force is built up on the seal ring and translated to the stabilator plates 22 and 23, thereby allowing them to flex.

The metal seal assembly 10 of the present disclosure is a highly elastic metal seal system that regulates the deflection and forces translated to the seal over the full range of the metal seal flex. This allows a single metal seal to accommodate the full range of possible dimensional variations of the piping/casing or outlet connection. The stabilator is used to govern the maximum amount of force translated to the seal surfaces to ensure a proper energization force to create the seal boundary without catastrophic seal failure. The geometry of the seal ring plates and the stabilator plates and their interaction provides a full range of controlled displacement for the seal ring plate to tolerate and accommodate dimensional (e.g., outer diameter) variations in the pipe/casing, until full sealing contact of the protrusion/lip on the seal ring abuts against the pipe/casing. The stabilator 14 provides a multitude of functions, including regulating forces translated to the seal throughout the installation sequence, controlling the seal interaction with other bodies over time, and aligning/centralizing the seal while controlling the dynamic response behavior of the seal body. During installation, the stabilator moves the critical sealing surfaces on the seal ring away from surfaces that could damage the sealing surface until it is moved into position to the target location in contact with the mating sealing surface such as pipe/casing.

The features of the present invention which are believed to be novel are set forth below with particularity in the appended claims. However, modifications, variations, and changes to the exemplary embodiments described above will be apparent to those skilled in the art, and the highly elastic metal seal described herein thus encompasses such modifications, variations, and changes and are not limited to the specific embodiments described herein.

What is claimed is:

1. A highly elastic annular seal assembly comprising:
a metal stabilator having inner and outer spaced-apart and projecting annular plates coupled to a common base and forming a U-shaped geometry; and
a metal seal ring having inner and outer spaced-apart and projecting annular plates coupled to a common base and having a U-shaped geometry with a central groove;
wherein the stabilator plates are configured to be disposed within the central groove between the seal ring plates, and the stabilator plates being configured to gradually urge the seal ring plates outward as the seal ring and stabilator are brought together until a portion of a first seal ring plate of the inner and outer seal ring plates contacts and forms a seal against a mating body disposed within the first seal ring plate,
wherein the annular seal assembly does not include a spacer disposed within the U-shaped geometry of the metal seal ring.

2. The seal assembly of claim 1, wherein a distal end of the inner seal ring plate comprises at least one bump protruding inwardly to form a sealing surface with the mating body.

3. The seal assembly of claim 1, wherein an exterior profile of the stabilator plates form a graduated tapered surface.

4. The seal assembly of claim 1, wherein a distal end of an interior profile of the seal ring plates from a graduated tapered surface.

5. The seal assembly of claim 1, wherein an inner surface of the inner stabilator plate includes a relief cut.

6. A highly elastic annular seal assembly configured for encircling a pipe, the seal assembly comprising:
- a metal stabilator having inner and outer projecting annular plates coupled to a common base, the first and second stabilator plates being spaced apart by a length of d; and
- a metal seal ring having inner and outer projecting annular plates coupled to a common base, the first and second seal ring plates being spaced apart by a length of D;
- wherein the seal ring plates and the stabilator plates are configured to fit together, and
- wherein the seal assembly does not include a spacer positioned between the first and second stabilator plates.

7. The seal assembly of claim 6, wherein D>d and the stabilator plates are disposed within a groove formed by the seal ring plates.

8. The seal assembly of claim 6, wherein a distal end of the inner seal ring plate comprises at least one bump protruding inwardly to form a sealing surface with the mating body.

9. The seal assembly of claim 6, wherein an exterior profile of the stabilator plates form a graduated tapered surface.

10. The seal assembly of claim 6, wherein a distal end of an interior profile of the seal ring plates from a graduated tapered surface.

11. The seal assembly of claim 6, wherein an inner surface of the inner stabilator plate includes a relief cut.

12. A highly elastic annular seal assembly comprising:
- a stabilator having first and second spaced-apart and projecting annular plates coupled to a base and defining a central groove therebetween; and
- a seal ring having first and second spaced-apart projecting annular plates coupled at a base and defining a central groove therebetween;
- wherein the projecting stabilator plates are configured to be disposed within the central groove between the projecting seal ring plates and to gradually urge the first seal ring plate inward as the seal ring plates and stabilator plates come together until a portion of the first seal ring plate contacts and forms a seal against a mating body,
- wherein the seal assembly does not include a spacer within the stabilator.

13. The seal assembly of claim 12, wherein a distal end of the first seal ring plate comprises at least one bump protruding inwardly to form the seal against the mating body.

14. The seal assembly of claim 12, wherein an exterior profile of the stabilator plates form a graduated tapered surface.

15. The seal assembly of claim 12, wherein a distal end of an interior profile of the first and second seal ring plates from a graduated tapered surface.

16. The seal assembly of claim 12, wherein an inner surface of the first stabilator plate includes a relief cut.

17. The seal assembly of claim 12, wherein at least one of the seal ring and stabilator is constructed of a metal.

* * * * *